US010936223B2

(12) United States Patent
Messing et al.

(10) Patent No.: US 10,936,223 B2
(45) Date of Patent: *Mar. 2, 2021

(54) INCREASING SERIAL READ PERFORMANCE

(71) Applicant: International Business Machines Corporation, Armonk, NY (US)

(72) Inventors: Deborah A. Messing, Beit Shemesh (IL); Harry R. McGregor, Tucson, AZ (US); Itzhack Goldberg, Hadera (IL); Christopher B. Moore, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,872

(22) Filed: Aug. 13, 2019

(65) Prior Publication Data
US 2019/0361619 A1 Nov. 28, 2019

Related U.S. Application Data

(63) Continuation of application No. 15/928,122, filed on Mar. 22, 2018, now Pat. No. 10,423,348.

(51) Int. Cl.
*G06F 12/00* (2006.01)
*G06F 3/06* (2006.01)
*G06F 13/16* (2006.01)

(52) U.S. Cl.
CPC .......... *G06F 3/0632* (2013.01); *G06F 3/0604* (2013.01); *G06F 3/067* (2013.01);
(Continued)

(58) Field of Classification Search
CPC .... G06F 3/0632; G06F 3/0604; G06F 3/0644; G06F 13/1668; G06F 2213/16
See application file for complete search history.

(56) References Cited

U.S. PATENT DOCUMENTS 6,973,654 B1 * 12/2005 Shutt ..................... G06F 16/278
718/105
9,104,332 B2 8/2015 Chambliss
(Continued)

OTHER PUBLICATIONS

Fu et al., "A Novel Dynamic Metadata Management Scheme for Large Distributed Storage Systems", The 10th IEEE International Conference on High Performance Computing and Communications, © 2008 IEEE DOI 10.1109/HPCC.2008.86, 6 pages.
(Continued)

*Primary Examiner* — John A Lane
(74) *Attorney, Agent, or Firm* — Brian M. Restauro

(57) ABSTRACT

Embodiments of the present invention provides methods, computer program products, and a system for improving serial performance of a computer system storage volume. Embodiments of the present invention can be used to reduce a partition scheme of a storage volume to allow for a computer system to read the storage volume using additional system resources that were previously idle during a serial read operation. Embodiments of the present invention can be used to reserve random-access memory (RAM) to store metadata describing data stored on a storage volume that utilizes a reduced partition scheme. Once the serial read of the storage volume is complete, the embodiments of the present invention can revert the partition scheme back to the original partition scheme for normal, non-serial read operations.

20 Claims, 4 Drawing Sheets

(52) U.S. Cl.
CPC ........ *G06F 3/0644* (2013.01); *G06F 13/1668* (2013.01); *G06F 2213/16* (2013.01)

(56) References Cited

U.S. PATENT DOCUMENTS

| | | | |
|---|---|---|---|
| 9,460,185 B2* | 10/2016 | Swift | G06F 16/27 |
| 10,459,655 B1* | 10/2019 | Greenwood | G06F 3/061 |
| 2018/0275908 A1* | 9/2018 | Anderes | H04N 21/40 |

OTHER PUBLICATIONS

Weil et al. "Dynamic Metadata Management for Petabyte-scale File Systems", 0-7695-2153-3/04 (c)2004 IEEE, University of California, Santa Cruz, 12 pages.

Messing et al., "Increasing Serial Read Performance", U.S. Appl. No. 15/928,122, filed Mar. 22, 2018, 25 pages.

Appendix P—List of IBM Patents or Patent Applications Treated as Related, Filed herewith, 2 Pages.

\* cited by examiner

INCREASING SERIAL READ PERFORMANCE

BACKGROUND

The present invention relates generally to the field of computational data storage, and more particularly to data processing in serial read mode.

In enterprise storage systems, virtual capacity is often broken down to smaller logical chunks called partitions. Every partition does not only contain the data written to the storage system, but has metadata that describes it. Often storage systems choose to store that metadata in-line in the partition, therefore increasing the partition size from just the data it contains to "data+metadata" size. A different approach is to store the metadata in a completely different structure. This structure often is in random-access memory (RAM) to allow fast metadata access and to allow quick decisions regarding user inputs/outputs (I/Os) and administrative operations (e.g., volume delete).

Another common feature in distributed storage systems is to group every N-partitions to a common storage entity (e.g., a slice) where different slices are distributed across all available computes powers in the system, but all partitions within the same slice are managed by a common compute power. This ensures that I/Os to various parts of the virtual capacity can be handled simultaneously by different threads and therefore different cores in the system. In order for a thread to handle I/Os for partitions of a given slice, then the thread is also the owner of metadata of the slice. Since the other computes are not servicing requests for the partition of that given slice, then those computes do not need access to the metadata, thus allowing the metadata to be broken into different parts and distributed across the system. This distribution mechanism is assuming that hosts will be accessing various parts of the virtual capacity at the same time, therefore having multiple cores handling the workload at all times.

SUMMARY

Embodiments of the present invention disclose a method, a computer program product, and a system for improving serial performance of a computer system storage volume. In one embodiment of the present invention, a method is provided comprising: receiving a serial read request for a first storage volume having data partitioned according to an original partition scheme, wherein the data has corresponding metadata that describes identification information for the data, and wherein the original partition scheme divides the data by a first partition size; reducing the first partition size of the original partition scheme to a second partition size by an amount less than the first partition size; splitting the data of the first storage volume into a plurality of partitions, wherein the plurality of partitions each have the second partition size such that, when added together, equals the first partition size of the original partition scheme; copying the data of the plurality of partitions of the first storage volume to a second storage volume; and reverting the data associated with the second partition size to the first partition size.

DETAILED DESCRIPTION

Figure 1:
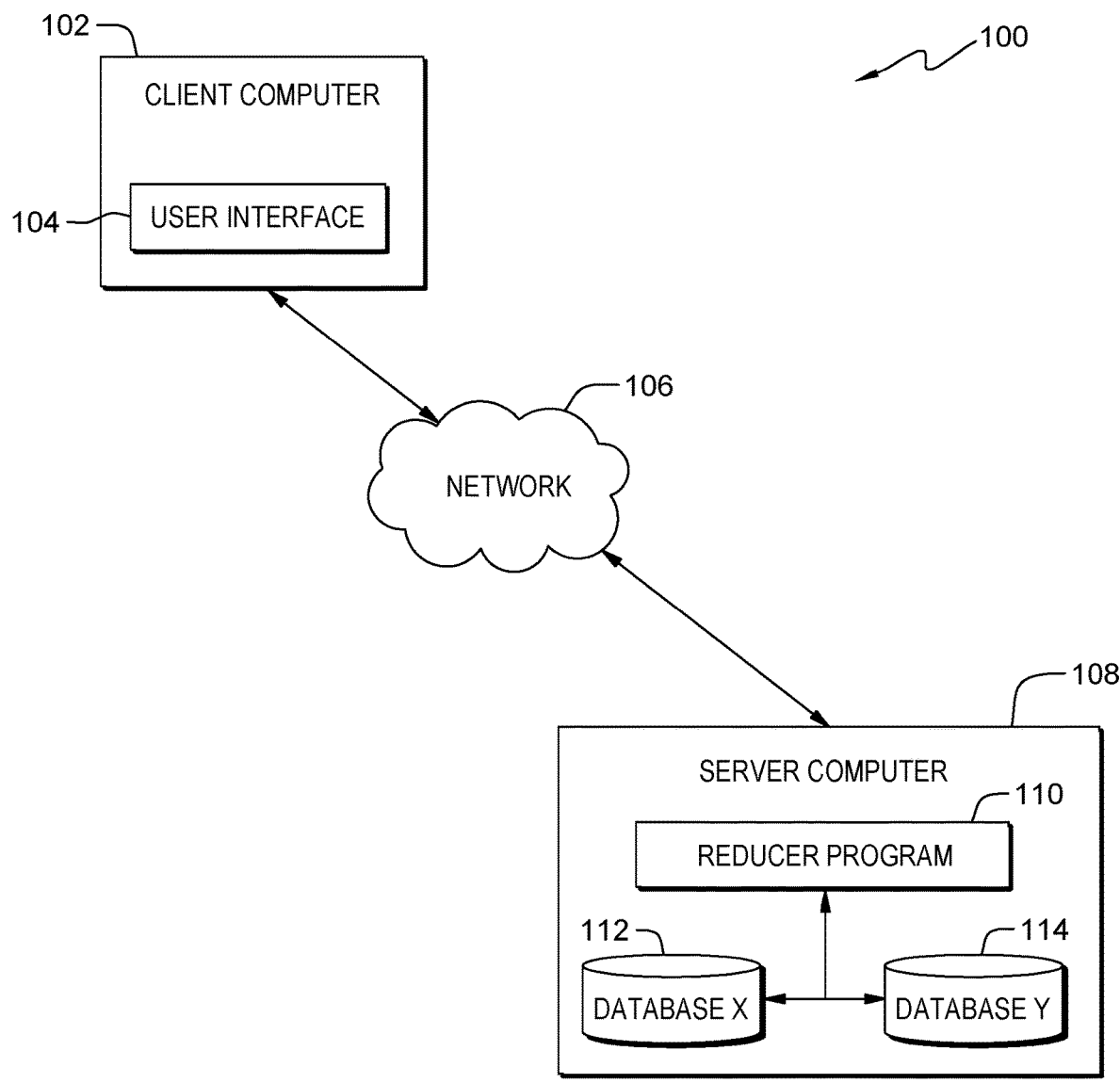
FIG. 1 is a functional block diagram illustrating a data server environment, in accordance with an embodiment of the present invention.

Embodiments of the present invention recognize that computing storage systems undergoing a serial read task can result in a computer system to not distribute workloads to all available resources, subsequently causing performance latencies and excessive lead times for data backup tasks. While there are systems that store metadata in random-access memory (RAM) that allow for swapping in and swapping out of relevant sections, many systems cannot allow for this if they want to be able to handle operations spread across the virtual capacity autonomously. Given that requirement, the size of the partition becomes important. The amount of RAM that is required for these systems is reproduced by the formula below:

$$R = \frac{C * M}{P} \qquad \text{Formula 1}$$

where R is the amount of RAM that is required, C is the size of the virtual capacity, M is the size of the metadata, and P is the partition size. For example, a system supporting a large virtual capacity with a small partition size would require a large amount of RAM. This often sets limitations for the granularity of the partition size, which cannot be too small.

Additionally, in a scenario where data is distributed across compute powers of the system in partition granularity, the size of the partition can be significant when an application or host is reading from the system in a serial fashion. Suppose a partition size of 10 MB and a host that is running a backup job of a volume, reading 1 MB at a time with a concurrency of four simultaneous inputs/outputs (I/Os) of 256 KB, that waits for each input/output (I/O) batch to complete before sending another request. This read pattern will result in the system not distributing the workload among all the available resources, leaving most of the system idle with only one active compute power. This can cause large latencies, and can slow down backup jobs that are often time-limited since they are run overnight and need to complete by the morning.

Embodiments of the present invention provide solutions for improving performance of serial read tasks in a storage system based on redistributing storage metadata from an original partition scheme to a reduced partition scheme when the original partition scheme is larger than an I/O batch of a computer system or a predetermined size set by a user. The embodiments of the present invention provide the capability to reduce run times for serial read operations for computer storage systems, subsequently also reducing power consumption. By reserving additional RAM for metadata of a reduced partition scheme, then a computer system with multiple CPUs can handle multiple I/Os, thus causing less queuing time and smaller latencies. In continuing from the prior example, if the reduced partition size was made to 256 KB, then all four I/Os handled by the system at any given time can be serviced by four different CPUs in contrast to the prior single CPU processing requests while other system resources sat idle. Implementation of embodiments of the invention may take a variety of forms, and exemplary implementation details are discussed subsequently with reference to the Figures.

FIG. 1 is a functional block diagram illustrating a data server environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Data server environment 100 includes client computer 102 and server computer 108, all interconnected over network 106. Client computer 102 and server computer 108 can each be a standalone computing device, a management server, a webserver, a mobile computing device, or any other electronic device or computing system capable of receiving, sending, and processing data. In other embodiments, client computer 102 and server computer 108 can each represent a server computing system utilizing multiple computers as a server system, such as in a cloud computing environment. In another embodiment, client computer 102 and server computer 108 can each be a laptop computer, a tablet computer, a netbook computer, a personal computer (PC), a desktop computer, a personal digital assistant (PDA), a smart phone, or any programmable electronic device capable of communicating with various components and other computing devices (not shown) within data server environment 100 via network 106. In another embodiment, client computer 102 and server computer 108 each represent a computing system utilizing clustered computers and components (e.g., database server computers, application server computers, etc.) that act as a single pool of seamless resources when accessed within data server environment 100. In some embodiments, client computer 102 and server computer 108 are a single device. Client computer 102 and server computer 108 may include internal and external hardware components capable of executing machine-readable program instructions, as depicted and described in further detail with respect to FIG. 5.

Server computer 108 includes reducer program 110, database X 112, and database Y 114. In general, reducer program 110 is a program capable of reducing an original partition scheme to a reduced partition scheme, converting metadata corresponding to the original partition scheme to the reduced partition scheme, and then distributing the metadata across the system to allow a computer system to utilize multiple compute powers for multiple I/Os when reading the data storage volume in serial read mode. Once the computer system has completed reading the data storage volume in serial read mode, reducer program 110 reverts the metadata corresponding to the reduced partition scheme back to the original partition scheme, and returns the ownership of the original partition to the original system resource.

As used herein, "data" is digital information stored on a storage disk, wherein the data is stored virtually in a partition; whereas "metadata" is information stored in a separate structure that describes the data as an index in directing the system to a location of the corresponding set of data on the storage disk. Metadata is generally stored on the storage disk, but it can also be stored on RAM of the computer system. Metadata is structured based upon a partition scheme for a corresponding set of data. For example, a 10 MB partition has corresponding metadata structured in a 10 MB partition scheme. Furthermore, the storage disk has corresponding metadata that describes the storage disk itself (not be confused with the metadata describing the data).

As used herein, a partition is a unit of virtual data storage contained on a database. As used herein, data storage is organized in a hierarchy, wherein a virtual capacity can contain a set of storage volumes, a storage volume can contain a set of slices, and a slice can contain a set of partitions. In some embodiments, a partition can be 1 MB. In other embodiments, a partition can be 16 MB.

As used herein, serial read mode is a mode of processing data of a partition in stored sequential order at a rate dependent on the number of simultaneous I/O batches and the size of each batch. For example, a 3 MB partition can be described as a sequential combination of 1 MB blocks of A, B, and C such that when combined in sequential order of A-B-C, the combination describes the 3 MB partition. In continuing the example, a computer system reading in serial read mode reads the 3 MB partition serially with a read rate of 1 MB (four simultaneous 256 KB I/O batches) by first requesting block A from the storage disk using the four I/O batches. Once the four I/O batches have completed the read request for block A, then the computer system requests block B from the storage disk which is subsequently retrieved by the four I/O batches. This process of requesting and acquiring blocks in sequential (serial) order is continued until the entire partition has been read. A computer system generally enters serial read mode when data is requested to be directly copied onto a new storage disk, such as data backup jobs, virtual machine cloning, or a large file coping.

Database X 112 and database Y 114 are repositories for computational data accessible by reducer program 110. Database X 112 and database Y 114 can be implemented with any type of storage device capable of storing data and configuration files that can be accessed and utilized by server computer 108, such as a database server, a hard disk drive, or a flash memory. As used herein, database X 112 stores a set of computational data readable by server computer 108, a set of metadata corresponding to the set of computation data, and a set of metadata corresponding to the storage volume. Computational data is organized on database X 112 into partitions. As used herein, database Y 114 can be a storage volume that is empty of data; a storage volume that contains some data, but has enough disk space to later contain the data copied from database X 112; or a storage volume that contains data that is marked for deletion (e.g., the computer system has permission to write over the data marked for deletion with a new set of data). As used herein, database Y 114 contains enough storage space to contain the data contained on database X 112 that is to later be copied onto database Y 114.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computer 102, server computer 108, and other computing devices (not shown) within data server environment 100.

Client computer 102 includes user interface 104, wherein user interface 104 allows a user to interact with server computer 108, and subsequently allows a user to interact with reducer program 110. In general, user interface 104 can be implemented using a browser and web portal or any program that transmits queries to, and receives results from, server computer 108. For example, user interface 104 can be used by a user to instruct reducer program 110 to begin a data backup operation of copying data from database X 112 to database Y 114, or to queue a set of volumes to be copied onto secondary set of volumes.

For illustrative purposes, the following discussion is made with respect to reducer program 110 hosted on server computer 108, and user interface 104 as part of client computer 102. However, it should be understood that reducer program 110 and user interface 104 can be on a single device, a combination of devices, and/or on one or more other components of data server environment 100.

Figure 2:
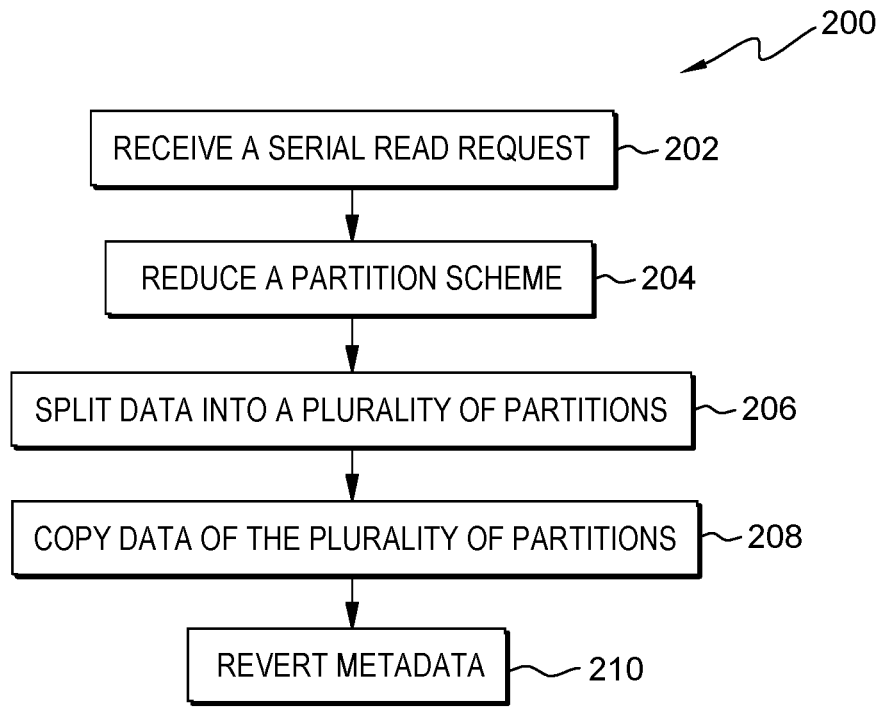
FIG. 2 is a flowchart depicting operational steps of a reducer program for transforming and distributing metadata between an original partition scheme to a reduced partition scheme of a storage volume when a computational system reads a storage volume serially, in accordance with an embodiment of the present invention.

FIG. 2 is a flowchart 200 depicting operational steps of a reducer program for transforming and distributing metadata between an original partition scheme to a reduced partition scheme of a storage volume when a computational system reads a storage volume serially, in accordance with an embodiment of the present invention.

In step 202, reducer program 110 receives a serial read request. In this embodiment, reducer program 110 receives a serial read request from a user instructing that a first storage volume, having data partitioned according to an original partition scheme, is to be copied to a second storage volume by determining a serial read request exists in a serial read request queue. As used herein, data has corresponding metadata that describes identification information for the data. As used herein, the original partition scheme divides the data by a first partition size. For example, a user inputs a data backup request on user interface 104 by selecting a first storage volume (e.g., database X 112) to be copied and a second storage volume (e.g., database Y 114) to become a copy of the first storage volume. Reducer program 110 receives the backup request via client computer 102, network 106, and server computer 108. Upon receiving the backup request, reducer program 110 adds the request to a serial read request queue, then proceeds to process the request by restructuring the metadata in step 204 in preparation for copying the first storage volume to the second storage volume.

In another embodiment, reducer program 110 receives the request indirectly from a user in a form of a predetermined or scheduled data backup request instituted by the user via user interface 104. For example, a user schedules a routine data backup request to occur weekly on a Saturday. Reducer program 110 then receives the routine backup request weekly on a Saturday, subsequently prompting reducer program 110 to restructure metadata in preparation for copying the first storage volume to the second storage volume.

In a further embodiment, if reducer program 110 receives second additional serial read request while reducer program 110 is performing a first serial read task, reducer program 110 stores the second request in the serial read request queue until the first serial read task is completed. Upon completion of the first serial read task, reducer program 110 proceeds in processing the second read request.

In an even further embodiment, reducer program 110 receives a serial read request by determining if a user read request reads from a storage volume serially, and then switching the storage volume from an original partition size to a reduced partition scheme. For example, a user tasks a computer system to copy a large file which can be read serially from a storage volume. Reducer program 110 determines the task requested by the user can be read serially from a storage volume, and then proceeds to step 204 in reducing the partition scheme of the storage volume being read serially.

In step 204, reducer program 110 reduces a partition scheme. In this embodiment, reducer program 110 reduces a first partition size of the partition scheme to a second partition size by an amount less than the first partition size by selecting the size of the I/O batch size of a computer system containing the first storage volume as the second partition size. In another embodiment, reducer program 110 reduces a first partition size of the partition scheme to a second partition size by an amount less than the first partition size by selecting a predetermined size set by a user.

In step 206, reducer program 110 splits the data into a plurality of partitions. In this embodiment, reducer program 110 splits the data into a plurality of partitions by reserving additional RAM for metadata of a reduced partition scheme, dividing the metadata based upon I/O batch size, and designating the first storage volume as entering serial read mode as described in greater detail with regard to FIG. 3, flowchart 300. As used herein, the plurality of partitions each have the second partition size such that, when added together, equals the first partition size of the original partition scheme.

In step 208, reducer program 110 copies data of the plurality of partitions. In this embodiment, reducer program 110 copies data of the plurality of partitions serially by instructing server computer 108 to begin reading data serially from database X 112 and writing the data as a copy onto database Y 114. For example, metadata for an original partition size of 10 MB is reduced to a partition scheme of 256 KB. Reducer program 110 instructs a computer system containing four CPUs and a data read rate of 1 MB (four simultaneous 256 KB I/O batches) to read and write data from a storage volume serially using the partition scheme of 256 KB, allowing the four simultaneous 256 KB I/O batches to be serviced by the four CPUs at any time during the serial read. Upon completion, reducer program 110 proceeds to step 208 in reverting the metadata to the original partition scheme.

In step 210, reducer program 110 reverts metadata. In this embodiment, reducer program 110 reverts metadata by determining that the serial read is completed, designating the end of serial read mode for the first storage volume, recombining the metadata to the original partition scheme, and checking for a serial read request in a request queue as described in greater detail with regard to FIG. 4, flowchart 400.

Figure 3:
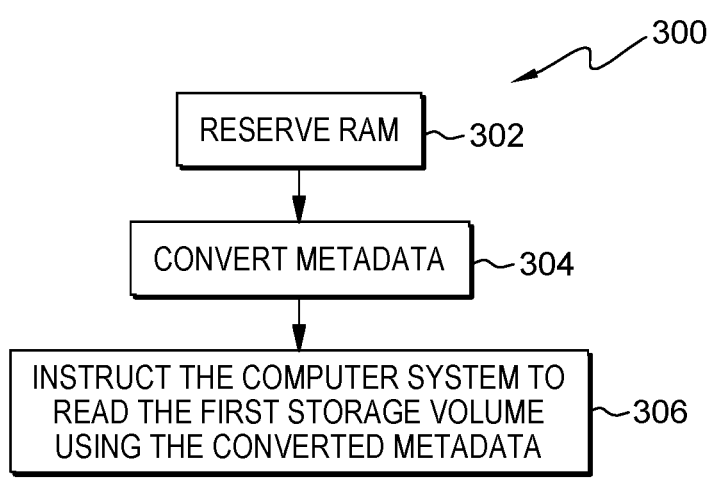
FIG. 3 is a flowchart depicting operational steps of a reducing partition scheme process, in accordance with an embodiment of the present invention.

FIG. 3 is a flowchart 300 depicting operational steps of a reducing partition scheme process, in accordance with an embodiment of the present invention.

In step 302, reducer program 110 reserves RAM. In this embodiment, reducer program 110 reserves RAM for metadata by instructing the computer system to allocate RAM based, at least in part, on a RAM calculation and an I/O batch size of the computer system. In this embodiment, reducer program 110 reserves RAM based on the formula reproduced below:

$$R = \frac{C*M}{P_O} + \frac{V*M}{P_R} \qquad \text{Formula 2}$$

where R is the amount of RAM that to be reserved, C is the size of the virtual capacity, M is the size of the metadata, V is the size of the storage volume, $P_O$ is the original partition size, and $P_R$ is the reduced partition size. In this embodiment, the storage volume is less than or equal to 30 TB and must be less than the system virtual capacity. In one embodiment, the reduced partition size is based upon the IOs batch size of the computer system. For example, suppose a computer system has a virtual capacity of 500 MB, a storage volume size of 50 MB, partition sizes of 10 MB, and corresponding metadata size of 60 B for each partition. According to Formula 1, the original required RAM to store the metadata of the virtual capacity is 2.93 KB. As used herein, data storage units convert using a binary system (e.g., 1024 B equates to 1 KB, 1024 KB equates to 1 MB, 1024 MB equates to 1 GB, and 1024 GB equates to 1 TB). Reducer program 110 receives a serial read request for the storage volume, and reserves RAM by determining the I/Os batch size of the computer system as being 256 KB, calculating the required RAM for storing the reduced metadata partition scheme based upon 256 KB partition sizes using Formula 2, and instructing the computer system to reserve the amount of RAM based upon the calculation. In this example, the amount of RAM required for storing the reduced metadata partition scheme for the storage volume becomes 2.93 KB+11.72 KB=14.65 KB according to Formula 2, thus reducer program 110 increases the RAM allocation for the metadata from 2.93 KB to 14.65 KB when reading the storage volume serially.

In another embodiment, the reduced partition size is based upon a predetermined size set by a user. For example, reducer program 110 reduces partition sizes to 512 KB based upon a predetermined size assigned to reducer program 110 when a reducer program 110 receives a serial read request for a storage volume. In this example, reducer program 110 calculates 2.93 KB+5.86 KB=8.79 KB of RAM is required, based upon Formula 2, for a system having a virtual capacity of 500 MB, a storage volume of 50 MB, 512 KB partitions, and 60 B metadata. Thus, reducer program 110 increases the RAM allocation for the metadata of the storage volume from 2.93 KB to 8.79 KB.

In step 304, reducer program 110 converts metadata. In this embodiment, reducer program 110 converts metadata corresponding to an original partition scheme to a reduced partition scheme by converting the metadata of the first storage volume to fit within the limitations specified by the reduced partition scheme. For example, for a computer system containing a 50 MB storage volume with 10 MB partitions, reducer program 110 converts the metadata of a 10 MB partition scheme to a 256 KB partition scheme.

In step 306, reducer program 110 instructs the computer system to read the first storage volume using the converted metadata. In this embodiment, reducer program 110 instructs the computer system to read the first storage volume using the converted metadata by designating, in the metadata corresponding to the storage volume, that the storage volume is being read in serial read mode. For example, after reducer program 110 converts the metadata corresponding to an original partition scheme to a reduced partition scheme for a storage volume, reducer program 110 writes in the metadata corresponding to the storage volume that the storage volume is entering serial read mode. This is done so that the computer system can recognize that the storage volume being read must be read using the reduced metadata partition scheme for the data locations instead of using the original metadata partition scheme for the data locations.

Figure 4:
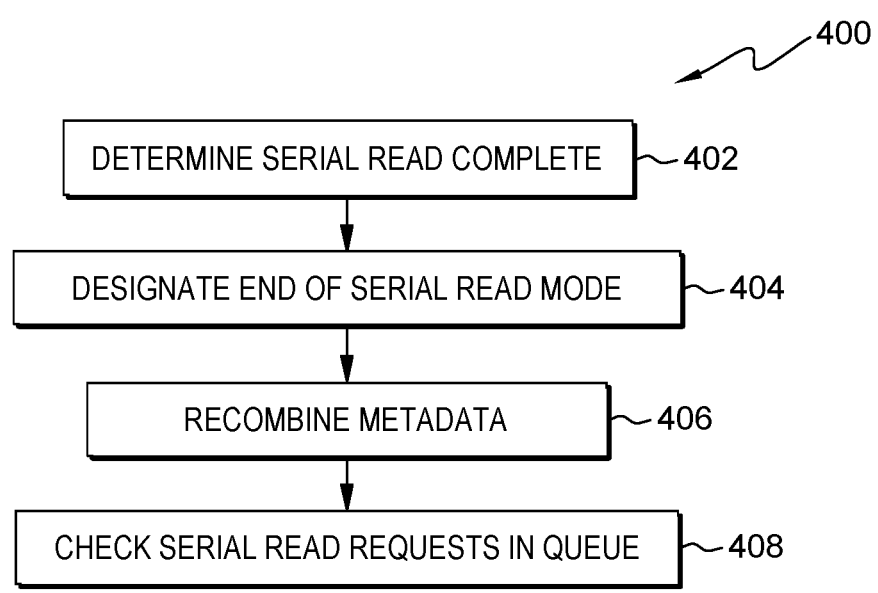
FIG. 4 is a flowchart depicting operation steps of a reverting partition scheme process, in accordance with an embodiment of the present invention.

FIG. 4 is a flowchart 400 depicting operational steps of a reverting partition scheme process, in accordance with an embodiment of the present invention.

In step 402, reducer program 110 determines serial read is complete. In this embodiment, reducer program 110 determines that serial read is complete by determining that the second storage volume contains a complete copy of the data stored on the first storage volume. For example, reducer program 110 can monitor the number of partitions (utilizing the reduced metadata partition scheme) in a storage volume requested for copy onto a second storage volume. If reducer program 110 determines there are 100 partitions to be copied from a first storage, reducer program 110 determines that the serial read is complete when the $100^{th}$ partition has finished coping onto the second storage volume. In another embodiment, reducer program determines that serial read is complete by discovering there is no more data to be read and copied by an I/O batch reading from the first storage volume. For example, during a serial read, if an I/O batch attempts to read data from a first storage volume, but the I/O batch is unable to acquire the data from the first volume since the computer system has reached the end of the data set, then reducer program 110 determines that the serial read is complete.

In step 404, reducer program 110 designates an end of serial read mode. In this embodiment, reducer program 110 designates an end of serial read mode for a first storage volume by writing in the metadata corresponding to the storage volume that the storage volume is no longer being read in serial read mode. For example, after reducer program 110 determines serial read has completed, reducer program 110 writes in the metadata corresponding to the storage volume that the storage volume is ending serial read mode. This is done so that the computer system can recognize that the storage volume being read must be read using a recombined metadata partition scheme for the data locations instead of using the original metadata partition scheme for the data locations.

In step 406, reducer program 110 recombines metadata. In this embodiment, reducer program 110 recombines the reduced metadata partition scheme into a recombined metadata partition scheme by instructing the computer system to restructure the reduced metadata partition back into the original partition scheme in the computer system RAM. Continuing from the example of step 306, after reducer program 110 designates a storage volume an end of serial read mode, reducer program 110 instructs the computer system to recombine the metadata of a 256 KB partition scheme back to the 10 MB partition scheme in the computer system RAM.

In a further embodiment, reducer program 110 implements any changes made to the metadata describing the data in the reduced metadata partition scheme when reducer program 110 recombines the metadata back into the original partition scheme. In other words, in the process of transforming metadata from an original partition scheme, to a reduced partition scheme, and back into the original partition scheme, reducer program 110 does not simply make a copy of the metadata using the original partition scheme prior to the transformation, store the metadata, then reload the copy of the metadata to revert the transformation. Instead, reducer program 110 reconstructs the metadata back into the original partition scheme based upon the reduced partition scheme, thus carrying over any updates or changes to the metadata while in the reduced partition scheme into the original partition scheme. For example, while using metadata in the reduced partition scheme, reducer program 110 detects that a region in a partition has become corrupt and subsequently notes the corruption in the metadata. When reducer program 110 later recombines the metadata into the original partition scheme, reducer program 110 recombines the metadata using the metadata of the reduced partition scheme (including the corruption note), thus creating a metadata that is of the original partition scheme that also includes the corruption note in the metadata. In an even further embodiment, reducer program 110 stores the recombined metadata onto both the first and second storage volumes.

In step 406, reducer program 110 checks for a serial read request in a serial read request queue. In this embodiment, reducer program 110 checks for a serial read request in a serial read request queue by determining if a second or subsequent serial read request exists in the serial read request queue. If reducer program 110 determines a second or subsequent serial read request exists in the serial read request queue, then reducer program 110 proceeds to step 204 in reducing partition scheme corresponding to data of the second or subsequent serial read request.

Figure 5:
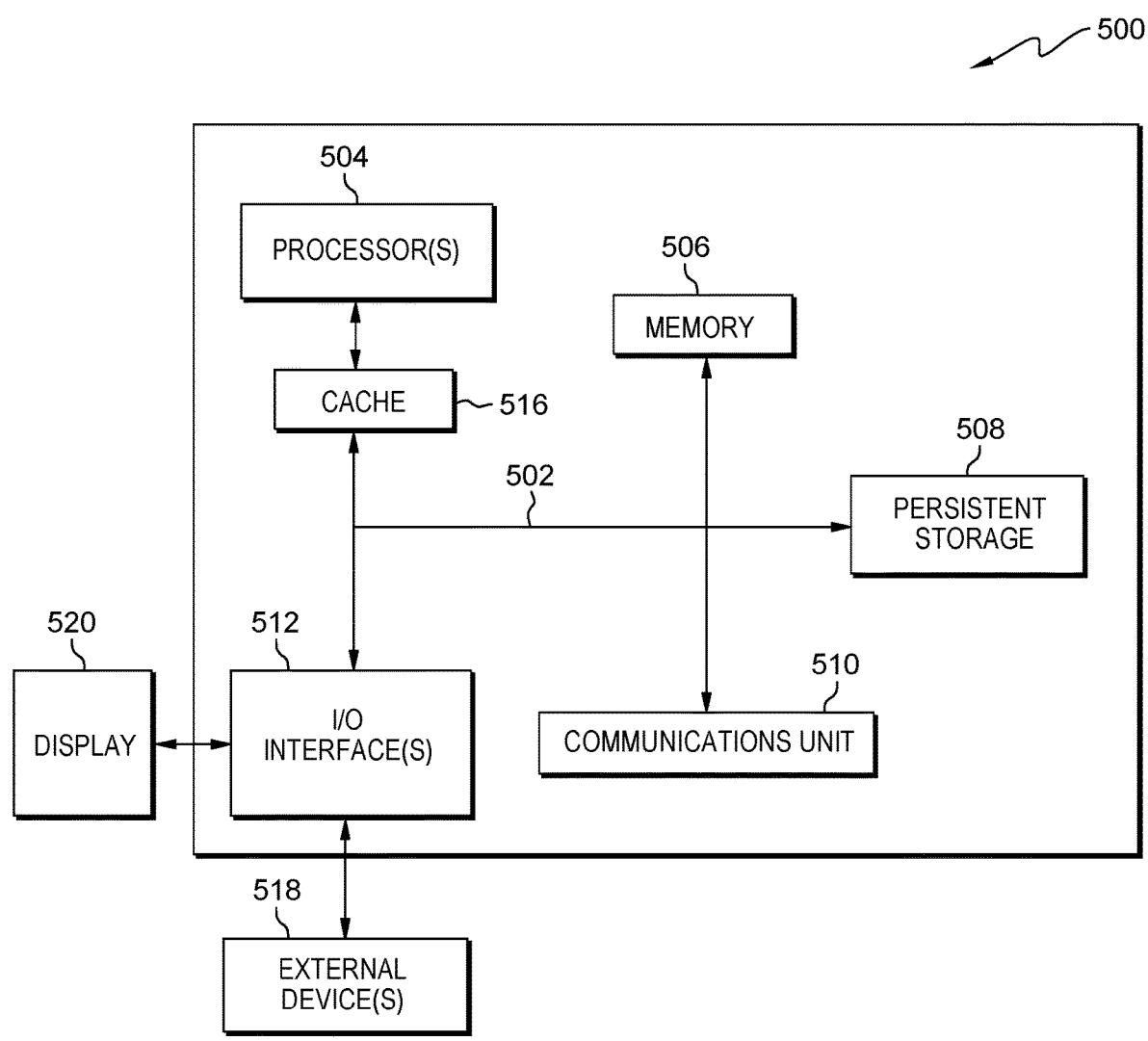
FIG. 5 depicts a block diagram of components of the computing systems of FIG. 1, in accordance with an embodiment of the present invention.

FIG. 5 depicts a block diagram of components of computing systems within data server environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Client computer 102 and server computer 108 include communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Reducer program 110 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Reducer program 110 may be downloaded to persistent storage 508 through communications unit 510.

I/O interface(s) 512 allows for input and output of data with other devices that may be connected to client computer 102 and server computer 108. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., Reducer program 110, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    reducing a first partition size of an original partition scheme of a first storage volume to a second partition size by an amount less than the first partition size;
    splitting data of the first storage volume into a plurality of partitions, wherein the plurality of partitions each have a second partition size such that, when added together, equals the first partition size of the original partition scheme;
    copying the data of the plurality of partitions of the first storage volume to a second storage volume; and
    reverting the data associated with the second partition size to the first partition size.

2. The computer-implemented method of claim 1, wherein receiving a serial read request for a first storage volume having data partitioned according to an original partition scheme comprises:
    receiving a serial read request from a user instructing that the first storage volume is to be copied to a second storage volume, wherein the serial read request is entered into a read request queue.

3. The computer-implemented method of claim 1, wherein the serial read request is a scheduled data backup request to be performed by a computer system at a designated time.

4. The computer-implemented method of claim 1, wherein splitting the data of the first storage volume into a plurality of partitions comprises:
reserving random-access memory (RAM) for the metadata based on the second partition size of the reduced partition scheme;
converting the metadata of the first storage volume to fit within limitations specified by the reduced partition scheme;
instructing a computer system to read the first storage volume using the converted metadata corresponding to the reduced partition scheme by designating the first storage volume as beginning a serial read mode for reading the data of the reduced partition scheme; and
reading the first storage volume serially based on instructions to the computer system for the first storage volume.

5. The computer-implemented method of claim 4, wherein reserving RAM for the metadata based on the second partition size of the reduced partition scheme is based, at least in part, on a RAM calculation and the I/O batch size of the computer system.

6. The computer-implemented method of claim 1, wherein reverting the data associated with the second partition size to the first partition size comprises:
determining whether a serial read of the first volume has completed;
responsive to determining that a serial read of the first volume has completed, instructing a computer system to read the first storage volume using the metadata corresponding to the original partition scheme; and
recombining the split data to the original partition scheme.

7. The computer-implemented method of claim 1, wherein reducing the first partition size of the partition scheme to a second partition size by an amount less than the first partition size further comprises:
reducing the first partition size of the partition scheme to a second partition size based, at least in part, on an input/output (I/O) batch size of a computer system containing the first storage volume.

8. The computer-implemented method of claim 1, wherein reducing the first partition size of the partition scheme to a second partition size by an amount less than the first partition size further comprises:
reducing the first partition size of the partition scheme to a second partition size based, at least in part, on a predetermined size set by a user.

9. A computer program product comprising:
one or more computer readable storage media and program instructions stored on the one or more computer readable storage media, the program instructions comprising:
program instructions to reduce a first partition size of an original partition scheme of a first storage volume to a second partition size by an amount less than the first partition size;
program instructions to split data of the first storage volume into a plurality of partitions, wherein the plurality of partitions each have a second partition size such that, when added together, equals the first partition size of the original partition scheme;
program instructions to copy the data of the plurality of partitions of the first storage volume to a second storage volume; and
program instructions to revert the data associated with the second partition size to the first partition size.

10. The computer program product of claim 9, wherein the program instructions to receive a serial read request for a first storage volume having data partitioned according to an original partition scheme comprise:
program instructions to receive a serial read request from a user instructing that the first storage volume is to be copied to a second storage volume, wherein the serial read request is entered into a read request queue.

11. The computer program product of claim 9, wherein the serial read request is a scheduled data backup request to be performed by the computer system at a designated time.

12. The computer program product of claim 9, wherein the program instructions to split the data of the first storage volume into a plurality of partitions comprise:
program instructions to reserve random-access memory (RAM) for the metadata based on the second partition size of the reduced partition scheme;
program instructions to convert the metadata of the first storage volume to fit within limitations specified by the reduced partition scheme;
program instructions to instruct a computer system to read the first storage volume using the converted metadata corresponding to the reduced partition scheme by designating the first storage volume as beginning a serial read mode for reading the data of the reduced partition scheme; and
program instructions to read the first storage volume serially based on instructions to the computer system for the first storage volume.

13. The computer program product of claim 9, wherein the program instructions to revert the data associated with the second partition size to the first partition size comprise:
program instructions to determine whether a serial read of the first volume has completed;
responsive to determining that a serial read of the first volume has completed, program instructions to instruct the computer system to read the first storage volume using the metadata corresponding to the original partition scheme; and
program instructions to recombine the split data to the original partition scheme.

14. The computer program product of claim 9, wherein the program instructions to reduce the first partition size of the partition scheme to a second partition size by an amount less than the first partition size further comprise:
program instructions to reduce the first partition size of the partition scheme to a second partition size based, at least in part, on an input/output (I/O) batch size of a computer system containing the first storage volume.

15. A computer system comprising:
one or more computer processors;
one or more computer readable storage media; and
program instructions stored on the one or more computer readable storage media for execution by at least one of the one or more processors, the program instructions comprising:
program instructions to reduce a first partition size of an original partition scheme of a first storage volume to a second partition size by an amount less than the first partition size;
program instructions to split data of the first storage volume into a plurality of partitions, wherein the plurality of partitions each have a second partition size such that, when added together, equals the first partition size of the original partition scheme;

program instructions to copy the data of the plurality of partitions of the first storage volume to a second storage volume; and program instructions to revert the data associated with the second partition size to the first partition size.

16. The computer system of claim 15, wherein the program instructions to receive a serial read request for a first storage volume having data partitioned according to an original partition scheme comprise:

program instructions to receive a serial read request from a user instructing that the first storage volume is to be copied to a second storage volume, wherein the serial read request is entered into a read request queue.

17. The computer system of claim 15, wherein the serial read request is a scheduled data backup request to be performed by the computer system at a designated time.

18. The computer system of claim 15, wherein the program instructions to split the data of the first storage volume into a plurality of partitions comprise:

program instructions to reserve random-access memory (RAM) for the metadata based on the second partition size of the reduced partition scheme;

program instructions to convert the metadata of the first storage volume to fit within limitations specified by the reduced partition scheme;

program instructions to instruct a computer system to read the first storage volume using the converted metadata corresponding to the reduced partition scheme by designating the first storage volume as beginning a serial read mode for reading the data of the reduced partition scheme; and program instructions to read the first storage volume serially based on instructions to the computer system for the first storage volume.

19. The computer system of claim 15, wherein the program instructions to revert the data associated with the second partition size to the first partition size comprise:

program instructions to determine whether a serial read of the first volume has completed;

responsive to determining that a serial read of the first volume has completed, program instructions to instruct the computer system to read the first storage volume using the metadata corresponding to the original partition scheme; and program instructions to recombine the split data to the original partition scheme.

20. The computer system of claim 15, wherein the program instructions to reduce the first partition size of the partition scheme to a second partition size by an amount less than the first partition size further comprise:

program instructions to reduce the first partition size of the partition scheme to a second partition size based, at least in part, on an input/output (I/O) batch size of a computer system containing the first storage volume.

* * * * *